March 31, 1936.
R. PEARSON
2,035,616
FURROW ATTACHMENT FOR GANG PLOWS
Filed Sept. 24, 1935
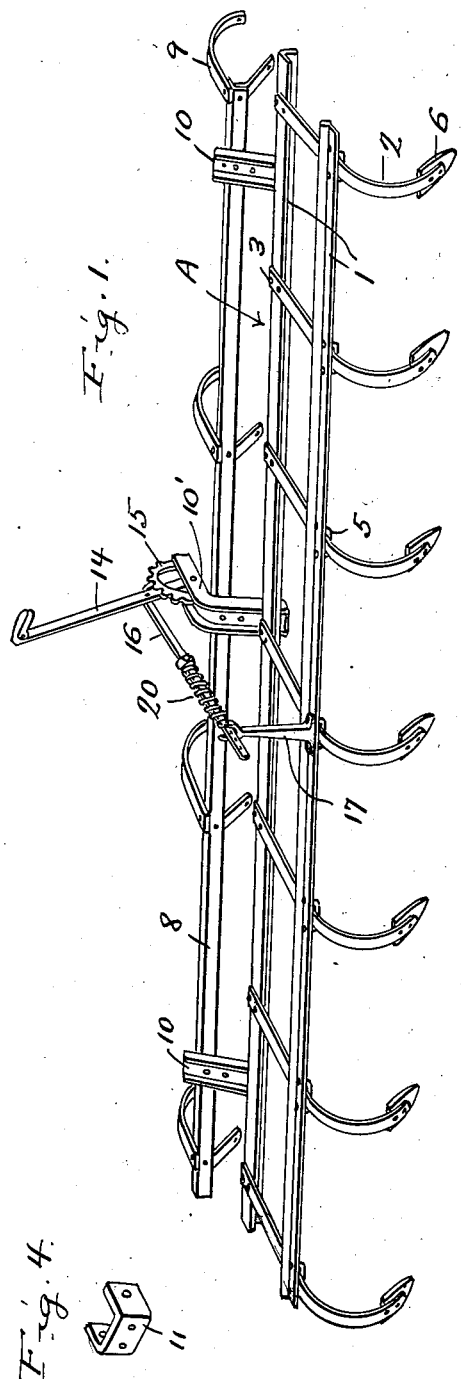
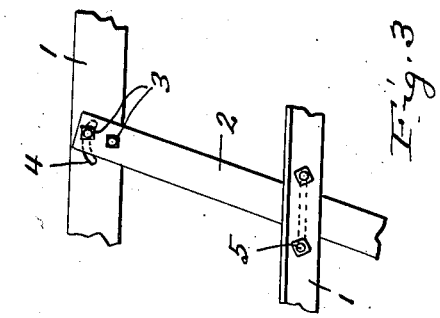
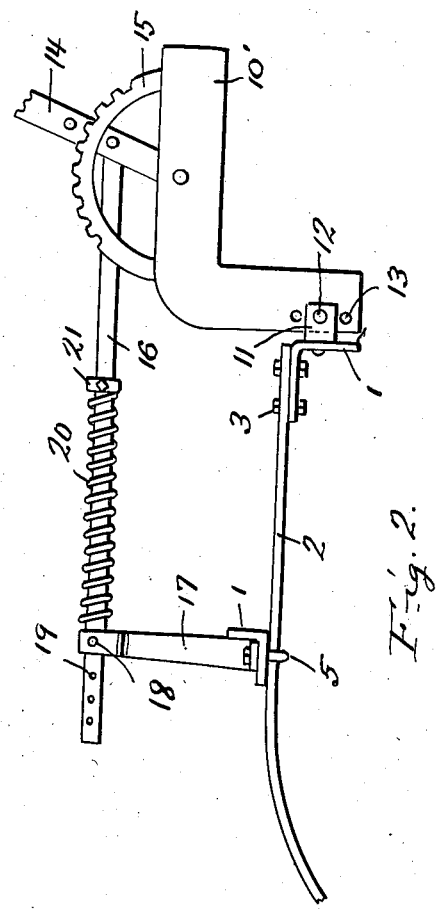
Inventor
Roger Pearson
By *Clarence A. O'Brien*
Attorney Patented Mar. 31, 1936

2,035,616

UNITED STATES PATENT OFFICE 2,035,616

FURROW ATTACHMENT FOR GANG PLOWS

Roger Pearson, Farnsworth, Tex.

Application September 24, 1935, Serial No. 41,939

2 Claims. (Cl. 97—5)

This invention relates to a furrow attachment for gang plows, the general object of the invention being to provide means for forming a plurality of furrows in the ground just plowed by the plow so that the ground plowed is left with a plurality of spaced furrows therein so that the land will not shed water, will hold the moisture and will not blow or be damaged by wind erosion.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a perspective view of the device forming the invention.

Figure 2 is a fragmentary transverse sectional view of Figure 1.

Figure 3 is a fragmentary plan view showing how the plow beams are connected with the frame.

Figure 4 is a view of one of the end brackets.

As shown in these views the frame A of the attachment includes the pair of bars 1 preferably of angle iron and arranged as shown in Figure 1, the bars being connected together by the straight portion of the plow beams 2 which are formed of spring steel. The front end of each beam is connected to the front bar 1 by a pair of bolts 3 the front one of which passes through an arcuate slot 4 in the bar 1 so that by loosening the nut of the front bolt the beam can be swung on the rearmost bolt as a pivot. A U-shaped bolt 5 connects a part of each beam to the rear bar 1. This arrangement will permit left or right adjustment of the beams, and this adjustment of the beams to the right or left will enable the plows to be adjusted so that the implement will move straight with the plow to which it is attached. A plow shovel 6 is attached to the lower end of the downwardly curved rear portion of the beam. A bar 8 is suitably connected to the rear of the gang plow by the parts 9, and channel-shaped members 10, the center one 10' of which is of angle shape, are connected with this bar and the front bar 1 of the frame A is hingedly connected to these members 10, 10' by the brackets 11, one of which is shown in Figure 4, these brackets being connected to the front bar 1 as shown in Figure 2 and are pivotally connected to the parts 10, 10' by the pins 12, each one of which can be placed in any one of a plurality of holes 13 formed in each of the parts 10, 10' so that the frame A may be raised and lowered with respect to the gang plow.

The frame A can be swung upwardly and downwardly upon the hinge formed by the parts 11 and 12 by means of a hand lever 14 pivoted to the member 10' and having the usual latch operating in a sector 15 attached to the member 10'. A bar 16 connects the lower part of the lever with a post 17 attached to the rear bar 1 of the frame A and having a forked upper end through which a pin 18 passes which also passes through any one of a plurality of holes 19 in the bar 16. A spring 20 on the bar 16 has one end bearing against the post and the other against an adjustable collar 21 on the bar 16, this spring acting to yieldingly hold the shovels in the ground and this arrangement tends to cause the shovels when striking clods of dirt to lift the same to the surface which also helps to prevent wind erosion.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. Means for forming furrows in land just plowed by a gang plow comprising a bar, means for connecting the bar to the rear portion of a gang plow, a second bar, means for hingedly connecting the second bar to the first bar, a plurality of spaced plow beams, means for connecting the front ends of said beams to the second bar, a third bar spaced rearwardly from the second bar and connecting the beams together, said beams having downwardly curved rear ends, a plow at the extremity of each downwardly curved end.

2. A furrow forming attachment for a gang plow comprising a bar, means for connecting the bar to the rear end of the gang plow, a second bar, means for hingedly connecting the second bar to the first bar, a plurality of spaced plow beams, a bolt connecting the front end of each beam to the second bar, a bolt and slot means for connecting said front end of each beam to the second bar, a third bar spaced rearwardly from the second bar and connecting the beams together, each beam having a downwardly curved rear end, a plow on each downwardly curved end, an upright on the third bar, a lever, a link connecting the lever with the upright and spring means tending to hold the plows in the ground.

ROGER PEARSON.